April 7, 1936.　　R. A. GEISELMAN　　2,036,268
REGULATING SYSTEM
Filed Nov. 8, 1934
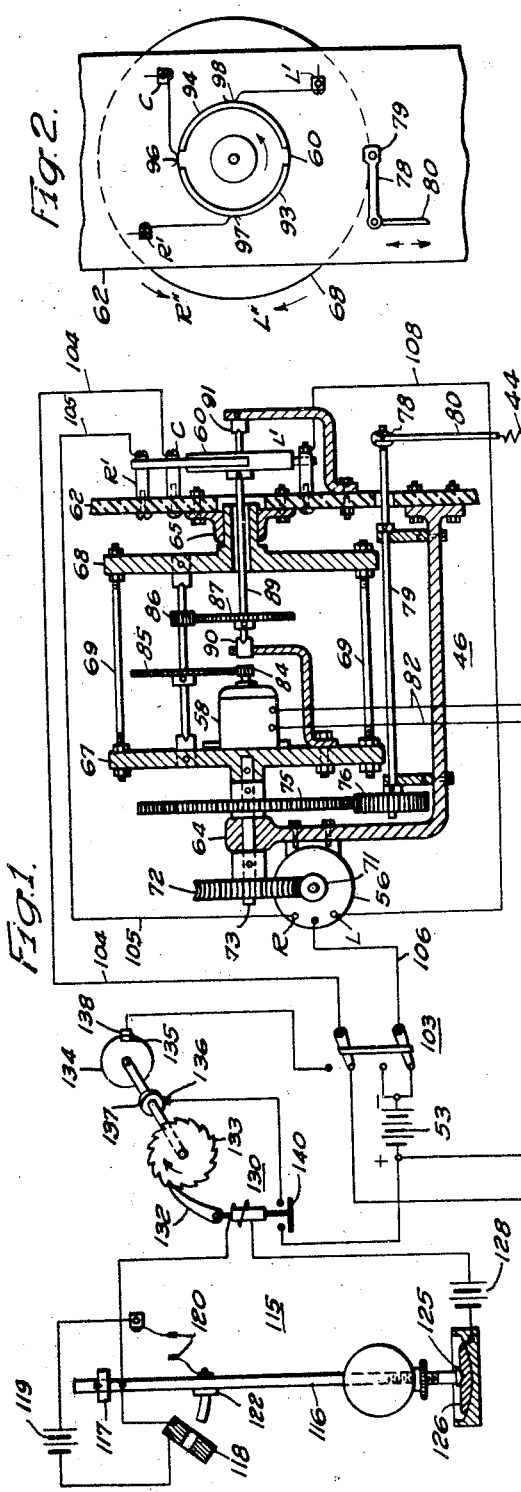
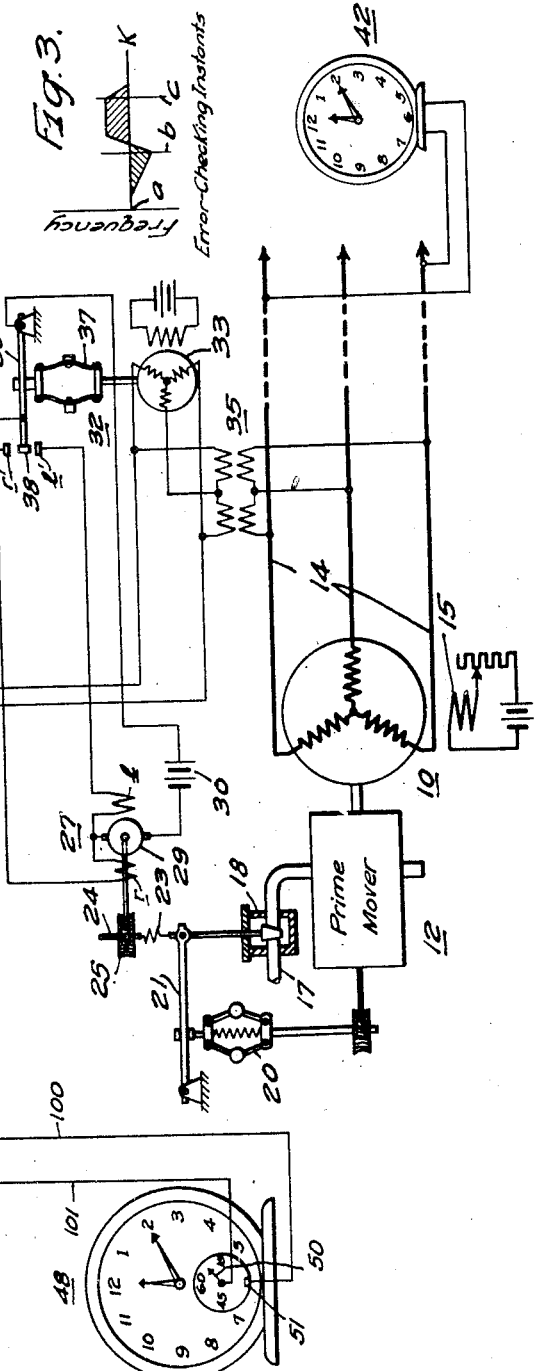
INVENTOR
Ralph A. Geiselman.
BY Ezra D. Savage
ATTORNEY
WITNESSES:
E. A. M?Closkey.
C. F. Bryant Patented Apr. 7, 1936

2,036,268

UNITED STATES PATENT OFFICE 2,036,268

REGULATING SYSTEM

Ralph A. Geiselman, Forest Hills, Pa., assignor to Westinghouse Electric & Manufacturing Company, East Pittsburgh, Pa., a corporation of Pennsylvania Application November 8, 1934, Serial No. 752,067

9 Claims. (Cl. 171—119)

My invention relates to regulating systems and has particular relation to compensating means, capable of cycle error integration, for frequency regulators utilized to maintain the frequency of an alternating current system at that precise adjustment required for accurate time keeping service.

With the introduction of electric clocks and other synchronous time keeping devices disposed to be driven from alternating-current power circuits that supply lighting and appliance devices, the problem of accurately regulating the power system frequency within those close limits necessitated for accurate time keeping has become one of commercial importance. It is to an improved manner of solving this problem that my invention is directed.

One object of my invention is to provide means associated with a standard reference clock or other master time checking device which automatically adjusts the setting of a power system frequency regulator in a manner that the average frequency of the system will be maintained at the value necessary to cause system energized clocks of the synchronous type to maintain accurate time.

Another object of my invention is the provision of a regulating system of the type described in which cycle errors are checked and corrected for at regular time intervals.

A further object of my invention is the provision of compensating means for a frequency regulating system that functions in a manner that the lost and gained cycles will exactly cancel each other over a given period of time.

In practicing my invention, which is applicable to frequency regulating systems of all types capable of calibration adjustment, I provide a standard reference clock or other master time keeping device which momentarily completes a checking circuit at regular intervals of time. Intermediate the clock and the regulator I dispose a time error integrating device which measures the number of cycles actually produced by the regulated power system. If at the end of each checking period this number does not correspond to the total required number of cycles during the time elapsed, as measured by the standard clock, the completion of the checking circuit functions to appropriately recalibrate the frequency regulator in a manner that the number of cycles produced by the power system during the succeeding period will be changed in the opposite direction from that of the first period error. In this manner the average frequency of the regulated power system over a plurality of checked periods will be maintained at the value necessary to effect accurate time keeping.

My invention, together with additional objects and advantages will best be understood from the following description of a specific embodiment thereof when taken in conjunction with the accompanying drawing, in which Figure 1 is a diagrammatic view of apparatus and circuits illustrating the time-error integrating compensating means applied to a regulator that is arranged to control the frequency of a prime-mover driven synchronous generator in accordance with my invention.

Fig. 2 is a view in end elevation of the error integrating device comprised by the system of Fig. 1, in which the arrangement of the contact segments carried by the frequency responsive rotating drum and the stationary contact members cooperating therewith is illustrated, and Fig. 3 is a diagram of curves illustrating the manner in which the compensating means of my invention functions to maintain the average frequency of the regulated system at a predetermined or desired value.

Referring to the drawing and particularly to Fig. 1 thereof, the power system with which the regulator compensating means of my invention is shown, comprises an alternating-current generator 10 that is driven by a prime mover 12 shown as being of a fluid actuated type. The generator comprises armature windings directly connected to the circuit conductors 14 of a power system and a direct current energized field winding 15.

The prime mover 12 is supplied with motive fluid from any suitable source (not shown) through a conduit 17 in which is disposed the usual control valve 18. The amount of opening of the valve 18 is controlled in a well known manner through the medium of a speed responsive governor shown as comprising a fly ball mechanism 20, driven by the prime mover, which determines the position of a pivoted arm 21 with the free end of which the movable member of the input control valve is connected. This governing mechanism functions to maintain the speed of the prime mover approximately constant.

A tension spring 23 is utilized to exert a biasing force upon the fly ball actuated lever 21 and is made adjustable in order to change the speed setting of the governor. The upper end of spring 23 is fixed to a threaded rod 24 which cooperates with an interiorly threaded gear wheel 25 arranged to be rotated by means of a suitable motor 27. The motor 27 is shown as comprising an armature winding 29 and two differentially related field windings r and l. When energized from a direct current source, such as a battery 30 through winding r, the motor rotates in a direction to raise the tension of spring 23, and thus increase the governor speed of the prime mover 12. Similarly, when energized through winding l the motor rotates in the opposite direction to lower the speed of the prime mover.

It will be recognized that changes in the prime mover speed effect corresponding changes in the frequency of the voltage supplied by the generator 10 to power circuit conductors 14. This frequency may thus be maintained at a desired value by providing means which appropriately energize the governor calibrating motor 27 upon variations in the frequency from the desired value. Such means is illustrated in Fig. 1 in the form of a frequency regulator 32, shown in an elementary and simplified form for the purposes of greater clarity.

As illustrated, the regulator 32 comprises a synchronous motor 33 which is energized through suitable potential transformers 35 from the power circuit 14. The motor 33, which thus rotates at all times at a speed that is directly proportional to the power system frequency, drives a sensitive fly ball mechanism 37 which, by determining the position of the contact member 38 carried by the pivoted arm 39, controls the operation of the governor calibrating motor 27. When the system frequency falls below the desired value, the contact member 38 is moved upwardly into engagement with a stationary member r', thereby completing an energizing circuit from the battery 30 for the motor 27 which causes the motor to recalibrate the prime-mover governor in the speed and frequency increasing direction. Similarly, when the system frequency rises above the desired value, contact member 38 of the regulator is moved downwardly into engagement with a stationary contact member l' to complete an energizing circuit for the motor 27 which effects a decrease in speed of prime mover 12 and a lowering of the power system frequency.

Regardless of how sensitive the frequency regulator 32 may be, it is found in practice that it is impossible for it, at any given setting or calibration, to maintain the system frequency exactly at a desired or constant value, over a period of time during which the power circuit conditions change, particularly, with respect to load demand. Consequently, an electric clock 42 of the synchronous type which is energized from the power circuit 14 will, in the absence of regulator compensating means, not keep exactly accurate time.

If, however, some means be provided whereby the errors in the regulated frequency may be accurately measured and the regulator be recalibrated from time to time not only to return to the desired average value of frequency but also to vary therefrom in the opposite direction from the original error for a time sufficient to neutralize the cycles lost or gained during the period of original error, the total number of cycles may, over a plurality of such time periods, be controlled to correspond to that required to maintain accurate time by clock 42. The compensating system of my invention fulfills this requirement in a manner now to be explained.

The frequency regulator 32 is provided with calibration adjusting means shown in the form of a tension spring 44 which biases the contact carrying arm 39 upwardly. An increase in the tension of the spring 44 causes the regulator to raise the value of the frequency which it tends to maintain while a decrease in spring tension similarly allows the regulator to lower the regulated frequency. This spring tension is adjusted through the medium of a mechanism 46 which forms an essential element of the compensating system of my invention.

In conjunction with mechanism 46, I provide a standard reference clock 48 or equivalent master time keeping device for the purpose of completing at regular intervals an error checking circuit. To effect such circuit completion, I provide in association with the second hand 50 of the clock, a stationary contact member 51 which is engaged by the hand once during each revolution, or at intervals of one minute. This circuit completes, from a suitable source of energization such as a battery 53, an energizing circuit for a regulator calibrating motor 56, when the regulated frequency has been in error during the preceding period. Such error is indicated by a synchronous motor 58 energized by the regulated circuit voltage through the transformer 35 which drives a segment carrying disk 60 which, in conjunction with contact members carried by mounting posts R', L' and C, appropriately routes the recalibration impulses to motor 56.

Motors 56 and 58 and contact making means 60 all form a part of the error integrating mechanism 46, the mechanical construction of which will now be explained. The mechanism is shown as being supported from a suitable panel 62, preferably of insulating material, which is mounted in a vertical position. Carried by bearings 64 and 65 is a cradle assembly comprising a pair of circular disks 67 and 68 which are mechanically spaced apart and secured together through the medium of tie rods 69. The entire cradle assembly may be rotated in its bearings 64 and 65 by operation of the motor 56 which drives a worm gear 71 that meshes with a gear wheel 72, carried by the cradle shaft 73. The rotative movements of the cradle are transmitted through the gear wheels 75 and 76 to a bell crank lever 78 (Fig. 2) carried on the end of shaft 79. The free end of the arm 78 is connected by any suitable means, such as a rod 80, with the regulator calibrating spring 44.

The synchronous motor 58 is mounted inside of the cradle, connections thereto from the transformer 35 being made by flexible connections 82 to allow rotative movements of the motor frame. The motor 58 drives a gear train comprising a pinion gear 84, a gear wheel 85, a second pinion gear 86, a gear wheel 87, and a shaft 89 on which is mounted the segment-carrying disk 60 before mentioned. This shaft is supported at its two ends by means of bearings 90 and 91 which permit it to freely rotate in accordance with the driving speed of synchronous motor 58. The disk 60, which is preferably of insulating material, carries on its outer periphery, a pair of conducting material segments 93 and 94, which are more clearly shown in Fig. 2. Bearing against the outer periphery of the segment carrying disk in the relative positions shown are contact members or brushes 96, 97 and 98, respectively, carried by the panel supported mounting studs C, R' and L'.

The synchronous motor 58 and the gear train through which it drives the segment carrying disk 60 are so designed that at the desired or proper average frequency of the regulated system, the disk 60 will rotate at such a speed that, upon each completion of the error checking circuit by the standard reference clock 48, the two conducting material segments 93 and 94 will occupy the symmetrical position shown with respect to contact brush 96 in which the brush bears against the disk 60 at a point on its periphery intermediate the two separated segments. For this condition, the energizing circuit of the regulator calibrating motor 56 set up by the second hand of clock 48 cannot be completed.

Hence, in the operation of the compensating system of my invention, so long as the regulated frequency is of the proper or desired value, no change in the calibration of the frequency regulator will be effected upon the engagement of the contact members 50 and 51. Suppose, however, that because of an increase in load on the generator 10, the frequency decreases slightly, the synchronous motor 58 will run at a correspondingly slower speed and, at the end of the period when the error checking is effected, it will not have made the required number of revolutions to bring the two segments 93 and 94, into the neutral positions with respect to the brush member 96.

Assuming the rotation of the disk 60 to be counter clockwise, as indicated by the arrow in Fig. 2, the contact segment 93 will, upon completion of the checking circuit by the clock 48, be in a lagging position in which it is engaged by the brush segments 96 and 97. This engagement completes an energizing circuit for the motor 56 that extends from one side of the battery 53 through conductor 100, contact member 51, the second hand 50 of the clock 48, conductor 101, the upper blade of a switch 103, conductor 104, mounting stud C and brush contact 96 carried thereby, the segment 93, brush contact 97 and its supporting stud R', and conductor 105 to the motor 56 through its terminal R, then from the middle terminal of the motor through conductor 106 and the lower blade of the switch 103 to the other side of battery 53.

Thus energized, the motor 56 rotates to adjust the regulator in a frequency-raising direction and causes the cradle 67—68 to be rotatively shifted in the direction indicated by arrow R'' in Fig. 2. The period of time during which this energization is maintained is relatively small because of the fact that the checking circuit maintained by the clock 48 is almost immediately interrupted and the further fact that the segments carried by the disk 60 of the mechanism 46 are rapidly rotating. The amount of the cradle shift is, however, sufficient to effect a substantial movement of the spring controlling arm 78 in an upward direction which serves to raise the value of frequency which the regulator 32 will maintain.

This shift in the cradle at the same time causes the position of the segment carrying disk 60 to be advanced to an extent which may or may not be sufficient to bring the segments to the neutral position upon the next setting up of the time checking circuit, as will be more completely explained.

In a similar manner, when the regulated circuit frequency is caused to rise above its desired value, the synchronous motor 58 of the mechanism 46 rotates at a correspondingly faster speed causing, upon the next setting up of the time checking circuit by the clock 48, the segment 94, carried by the disk 60, to occupy an advanced position in the direction of rotation of the disk in which position it engages the brush contacts 96 and 98. This engagement completes an energizing circuit for the regulator calibrating motor 56 which extends from the battery 53 through the conductor 100, contact members 50 and 51 of the clock 48, conductor 101, the switch 103, conductor 104, brush contact 96 carried by the mounting stud C, the segment 94, brush contact 98 carried by the mounting stud L', conductor 108, motor 56, through terminal L, and conductor 106 back to the battery 53.

Thus energized, the motor 56 rotates in the regulator frequency-lowering direction and shifts the position of the cradle in the direction indicated by L'' in Fig. 2. As a result of this shift, the spring controlling arm 78 moves downwardly to lower the tension of the calibrating spring 44. This causes the regulator to maintain a lower frequency during the succeeding period. The shift in cradle position also correspondingly shifts the rotative position of segment carrying disk 60 in the backward direction L''.

In addition to correcting the frequency of the system, upon its variation from the desired average value, the compensating system of my invention adds or subtracts the cycles lost or gained by the generator, and acts upon the frequency regulator in a manner that these error cycles are eliminated during succeeding checking periods, so that over a substantial number of periods, the total number of cycles will be that required to cause the time indications of the system driven clock 42 to correspond to those of the master clock 48. The manner in which this is accomplished is shown by the curves of Fig. 3. Assume the first considered condition in which the frequency of the regulated generator 10 drops below the desired value between the error checking instants $a$ and $b$. As a result of this lowering of the frequency, there will be lost, during period $a$—$b$, a number of cycles represented by the shaded area, below the desired or proper average value of frequency $k$.

Upon the completion of the error checking circuit, at instant $b$, the integrating mechanism 46 effects a recalibration of the frequency regulator 32 which causes it to maintain a somewhat higher frequency during the period $b$—$c$. If it happens, as is represented by Fig. 3, that this higher value is sufficient to regain during this period the cycles lost during period $a$—$b$, the average frequency for the two periods will be of the desired value $k$ and upon the completion of the error checking circuit at time $c$, the compensation of the regulator will be readjusted so that it will maintain frequency $k$ until some change in power circuit conditions take place.

It will be understood that the corrections for cycles lost or gained may require a plurality of time checking periods before the neutralized or balanced value is obtained, the showing of Fig. 3 assuming a simple condition lending itself to ready explanation.

Because of the smallness of the corrective impulses and the lapse of time which occurs therebetween, the hunting or over-shooting condition so common to most regulating equipments in the absence of special preventive means, is not present in the automatic compensating system of my invention. In fact, tests conclusively demonstrate the system to be inherently capable of high stability as well as precise accuracy.

In cases in which a standard reference clock of the type illustrated at 48 is not available on equivalent mechanism illustrated generally at 115 may instead be utilized. To shift the control of the integrating mechanism 46 from clock 48 to time keeping device 115, the blades of switch 103 may be moved to their upper positions.

As illustrated, the device 115 comprises a pendulum 116 suspended by a suitable knife edge from a stationary support 117 and arranged to be driven by means of a magnet 118 which derives its energization from a battery 119 upon engagement of the contact members 120, which engagement takes place when the pendulum is at its right-hand limit of swing. Energization of the winding 118 exerts an attractive force upon a piece of magnetic material 122 which assists the pendulum in swinging back to the left-hand limit of travel, and in this manner the pendulum is continuously driven.

Positioned on the lower tip of the pendulum is a contact member 125 which, in the central position of the pendulum as illustrated, makes contact with a suitable stationary member shown as a mercury pool 126. Engagement of members 125 and 126 completes an energizing circuit for the actuating winding of a relay 130 from a source of energy, shown as a battery 128. Consequently, in the operation of the pendulum each swing past the central position causes the movable member of the relay 130 to be actuated upwardly. This movable member drives a pawl device 132 which for each relay actuation advances a notched gear wheel 133 one tooth position forward in the clockwise direction.

The gear wheel 133 drives a drum segment 134 which carries a conducting member 135 at one point on its periphery that is connected to a slip ring 137, carried by the drum shaft, and to a brush member 136.

Each time the contact member 135 rotates to the position illustrated, it engages a stationary contact member 138 and closes one point of a time-checking circuit in a manner similar to the operation of the clock 48, which has already been explained. This checking circuit is completed for a moment only by a contact member 140 carried by the pawl actuating relay 130.

Inasmuch as the operation of the complete compensating system of my invention is identical when the equipment 115 is used as when the clock 48 is utilized, no further detailed explanation thereof will here be made.

Although I have shown and described certain specific embodiments of my invention, I am fully aware that many modifications thereof are possible. My invention is not to be restricted, therefore, except insofar as is necessitated by the prior art and by the scope of the appended claims.

I claim as my invention:

1. A compensating system for a frequency regulator comprising, in combination, a motor for adjusting the calibration of the regulator, a rotatable drum carrying on opposite halves of its periphery two circumferentially separated contact segments, a pair of stationarily mounted contact brushes disposed to bear against said drum at points on its periphery separated by an angular distance less than the circumferential length of each contact segment, a master time-keeping device having associated therewith a pair of contact members which it momentarily closes at regularly recurring time intervals, synchronous means, energized from the circuit whose frequency is being regulated, for driving said rotatable drum, and a circuit, which includes the contact members of the master time-keeping device and the contact brushes which bear against the segment-carrying drum, for energizing said calibration-adjusting motor.

2. A compensating system for a frequency regulator comprising, in combination, a motor for adjusting the calibration of the regulator, a rotatable drum carrying on opposite halves of its periphery two circumferentially separated contact segments, a pair of stationarily mounted contact brushes disposed to bear against said drum at points on its periphery separated by an angular distance less than the circumferential length of each contact segment, a master time-keeping device having associated therewith a pair of contact members which it momentarily closes at regularly recurring time intervals, synchronous means, energized by the voltage whose frequency is being regulated, for driving said rotatable drum, and a circuit, which includes the contact members of the master time-keeping device and the contact brushes which bear against the segment-carrying drum, for energizing said calibration-adjusting motor, said synchronous means being so proportioned with respect to the master time-keeping device that when the regulated voltage passes through the desired number of cycles during each interval between successive contact closures by the time-keeping device the segment-carrying drum will, at the instant of contact closure, occupy a position in which neither of the two segments engages both of the associated contact brushes.

3. A compensating system for a frequency regulator, having associated therewith a calibration-adjusting motor, comprising, in combination, a rotatable drum having a pair of circumferentially separated contact segments disposed on opposite halves of its periphery, three stationarily mounted contact brushes disposed to bear against said drum at points on its periphery so separated that the angular distance between the intermediate or common brush and each of the remaining two brushes is less than the circumferential length of each contact segment, a master time-keeping device having associated therewith a pair of contact members which it momentarily closes at regularly recurring time intervals, synchronous means, energized by the voltage whose frequency is being regulated, for driving said rotatable drum, and a circuit which includes the contact members of the time-keeping device, the common contact brush which bears against the drum, and that associated brush which is positioned beyond the common brush in the direction of drum rotation, for energizing said calibration-adjusting motor in the frequency-raising direction.

4. A compensating system for a frequency regulator, having associated therewith a calibration-adjusting motor, comprising, in combination, a rotatable drum having a pair of circumferentially separated contact segments disposed on opposite halves of its periphery, three stationarily mounted contact brushes disposed to bear against said drum at points on its periphery so separated that the angular distance between the intermediate or common brush and each of the remaining two brushes is less than the circumferential length of each contact segment, a master time-keeping device having associated therewith a pair of contact members which it momentarily closes at regularly recurring time intervals, synchronous means, energized by the voltage whose frequency is being regulated, for driving said rotatable drum and a circuit which includes the contact members of the time-keeping device, the common contact brush which bears against the drum, and that associated brush which is positioned ahead of the common brush in the direction of drum rotation, for energizing said calibration-adjusting motor in the frequency-lowering direction.

5. A compensating system for a frequency regulator, having associated therewith a calibration-adjusting motor, comprising, in combination, a rotatable drum having a pair of circumferentially separated contact segments disposed on opposite halves of its periphery three stationarily mounted contact brushes disposed to bear against said drum at points on its periphery so separated that the angular distance between the intermediate or common brush and each of the remaining two brushes is less than the circumferential length of each contact segment, a master time-keeping device having associated therewith a pair of contact members which it momentarily closes at regularly recurring time intervals, synchronous means, energized by the voltage whose frequency is being regulated, for driving said rotatable drum at such a speed that when the regulated voltage passes through the desired number of cycles during each interval between successive contact closures by the time-keeping device the drum will, at the instant of such closure, occupy a position in which neither of its two segments is engaged by the said common contact brush associated therewith, a circuit which includes the contact members of the time-keeping device, the common contact brush for the drum, and that associated brush which is positioned beyond the common brush in the direction of drum rotation, for energizing said calibration-adjusting motor in the frequency-raising direction, and a circuit which similarly includes the contact members of the time-keeping device, the common contact brush for the drum and the remaining associated brush, which is positioned ahead of the common brush in the direction of drum rotation, for energizing said calibration-adjusting motor in the frequency-lowering direction.

6. A compensating system for a frequency regulator comprising, in combination, a calibration-adjusting motor for the regulator, a rotatably mounted structure operably connected with said motor, a synchronous motor, energized by the voltage whose frequency is being regulated, carried within said structure, a drum, having its axis of rotation coincident with that of the said structure, disposed to be driven by said synchronous motor, said drum having two circumferentially separated contact segments respectively disposed on opposite halves of its periphery, a pair of stationarily mounted contact brushes disposed to bear against said drum at points separated by a circumferential distance which is less than the circumferential length of each contact segment, a master time-keeping device having associated therewith a pair of contact members which it momentarily closes at regularly recurring time intervals, and a circuit, which includes the contact members of the time-keeping device and the contact brushes associated with the segment-carrying drum, for energizing said calibrating-adjusting motor.

7. A compensating system for a frequency regulator comprising, in combination, a calibration-adjusting motor for the regulator, a rotatably mounted structure operably connected with said motor, a synchronous motor, energized by the voltage whose frequency is being regulated, carried within said structure, a drum, having its axis of rotation coincident with that of the said structure, disposed to be driven by said synchronous motor, said drum having two circumferentially separated contact segments respectively disposed on opposite halves of its periphery, a pair of stationarily mounted contact brushes disposed to bear against said drum at points separated by a circumferential distance which is less than the circumferential length of each contact segment, a master time-keeping device having associated therewith a pair of contact members which it momentarily closes at regularly recurring time intervals, and a circuit, which includes the contact members of the time-keeping device and the contact brushes associated with the segment-carrying drum, for energizing said calibration-adjusting motor, the speed of said drum being such that when the regulated voltage passes through the desired number of cycles during each interval between successive contact closures by the time-keeping device, the drum will, at the instant of such contact closure, occupy a position in which neither of the two segments engages both of the associated contact brushes.

8. A compensating system for a frequency regulator comprising, in combination, a rotatable drum having a pair of circumferentially separated contact segments disposed on opposite halves of its periphery, three stationarily mounted contact brushes disposed to bear against said drum at points on its periphery so separated that the angular distance between the intermediate or common brush and each of the remaining two brushes is less than the circumferential length of each contact segment, a master time-keeping device having associated therewith a pair of contact members which it momentarily closes at regularly recurring time intervals, a calibration-adjusting motor for the regulator, a rotatable structure, mounted with its axis of rotation coincident with that of said segment-carrying drum, operably connected with said motor, a synchronous motor, energized by the voltage under control of the frequency regulator, carried within said structure and disposed to drive said segment-carrying drum at such a speed that when the regulated voltage passes through the desired number of cycles during each interval between successive contact closures by the time-keeping device the drum will, at the instant of such closure occupy, a position in which neither of its two segments is engaged by the said common contact brush associated therewith, and a circuit which includes the contact members of the time-keeping device, the common contact brush for the drum, and that associated brush which is positioned beyond the common brush in the direction of drum rotation, for energizing said calibration-adjusting motor in the frequency-raising direction.

9. A compensating system for a frequency regulator comprising, in combination, a rotatable drum having a pair of circumferentially separated contact segments disposed on opposite halves of its periphery, three stationarily mounted contact brushes disposed to bear against said drum at points on its periphery so separated that the angular distance between the intermediate or common brush and each of the remaining two brushes is less than the circumferential length of each contact segment, a master time-keeping device having associated therewith a pair of contact members which it momentarily closes at regularly recurring time intervals, a calibration-adjusting motor for the regulator, a rotatable structure, mounted with its axis of rotation coincident with that of said segment-carrying drum, operably connected with said motor, a synchronous motor, energized by the voltage under control of the frequency regulator, carried within said structure and disposed to drive said segment-carrying drum at such a speed that when the regulated voltage passes through the desired number of cycles during each interval between successive contact closures by the time-keeping device the drum will, at the instant of such closure occupy, a position in which neither of its two segments is engaged by the said common contact brush associated therewith, and a circuit which includes the contact members of the time-keeping device, the common contact brush for the drum and that associated brush which is positioned ahead of the common brush in the direction of drum rotation, for energizing said calibration-adjusting motor in the frequency-lowering direction.

RALPH A. GEISELMAN.